US009971971B2

(12) United States Patent
Eicher et al.

(10) Patent No.: US 9,971,971 B2
(45) Date of Patent: May 15, 2018

(54) COMPUTING INSTANCE PLACEMENT USING ESTIMATED LAUNCH TIMES

(71) Applicant: Amazon Technologies, Inc., Reno, NV (US)

(72) Inventors: Anton André Eicher, Cape Town (ZA); Matthew James Eddey, Seattle, WA (US); Richard Alan Hamman, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/482,812

(22) Filed: Sep. 10, 2014

(65) Prior Publication Data

US 2016/0070590 A1    Mar. 10, 2016

(51) Int. Cl.
*G06F 9/00* (2006.01)
*G06N 99/00* (2010.01)
*G06F 9/50* (2006.01)
*G06F 9/455* (2018.01)

(52) U.S. Cl.
CPC ....... *G06N 99/005* (2013.01); *G06F 9/45558* (2013.01); *G06F 9/505* (2013.01); *G06F 2009/4557* (2013.01); *G06F 2009/45562* (2013.01)

(58) Field of Classification Search
CPC .......... G06F 9/48; G06F 9/50; G06F 9/45558; G06F 9/505; G06F 2009/45562; G06F 2009/4557; G06N 99/005
See application file for complete search history.

(56) References Cited

U.S. PATENT DOCUMENTS

| | | | |
|---|---|---|---|
| 2007/0067428 A1* | 3/2007 | Ogawa et al. | ................ 709/223 |
| 2010/0269109 A1* | 10/2010 | Cartales | ........................... 718/1 |
| 2014/0068077 A1* | 3/2014 | Hadad | .................. G06F 9/5027 709/226 |

* cited by examiner

*Primary Examiner* — Craig Dorais
*Assistant Examiner* — Carina Yun
(74) *Attorney, Agent, or Firm* — Thorpe North & Western, LLP.

(57) ABSTRACT

Technology is described for determining computing instance placement. A request to launch a computing instance in a computing service environment may be received. Estimated launch times for the computing instance to launch on individual physical hosts in a group of physical hosts may be identified. A physical host in the group of physical hosts that can provide placement of the computing instance may be selected based in part on the estimated launch times for the computing instance and additional factors related to placement of the computing instance.

18 Claims, 10 Drawing Sheets

COMPUTING INSTANCE PLACEMENT USING ESTIMATED LAUNCH TIMES

BACKGROUND

The advent of virtualization technologies for computing resources has provided benefits with respect to managing large-scale computing resources for many customers with diverse needs. In addition, virtualization technologies have allowed various computing resources or computing services to be efficiently and securely shared by multiple customers. For example, virtualization technologies may allow a single physical host (e.g., a single physical computing machine) to be shared among multiple customers by providing each customer with one or more computing instances hosted by the single physical host using a hypervisor. Each computing instance may be a guest machine acting as a distinct logical computing system that provides a customer with the perception that the customer is the sole operator and administrator of a given virtualized hardware computing resource.

A request to launch a computing instance may entail identifying available computing resources (e.g., a computing slot in a hypervisor) on which the computing instance may be executed. For example, one or more physical hosts (e.g., server computers or physical computing machine) may be queried to determine whether sufficient computing resources exist on a physical computing machine to launch and execute a computing instance and whether a physical host meets additional specified criteria (e.g., disaster mitigation criteria, licensing criteria, etc.) for the group of physical hosts. In a case where a physical host is identified as having computing resources available to execute the computing instance and meeting the specific criteria, the computing instance may be launched on the physical host, and a customer may be notified that the computing instance has been launched.

DETAILED DESCRIPTION

Figure 1:
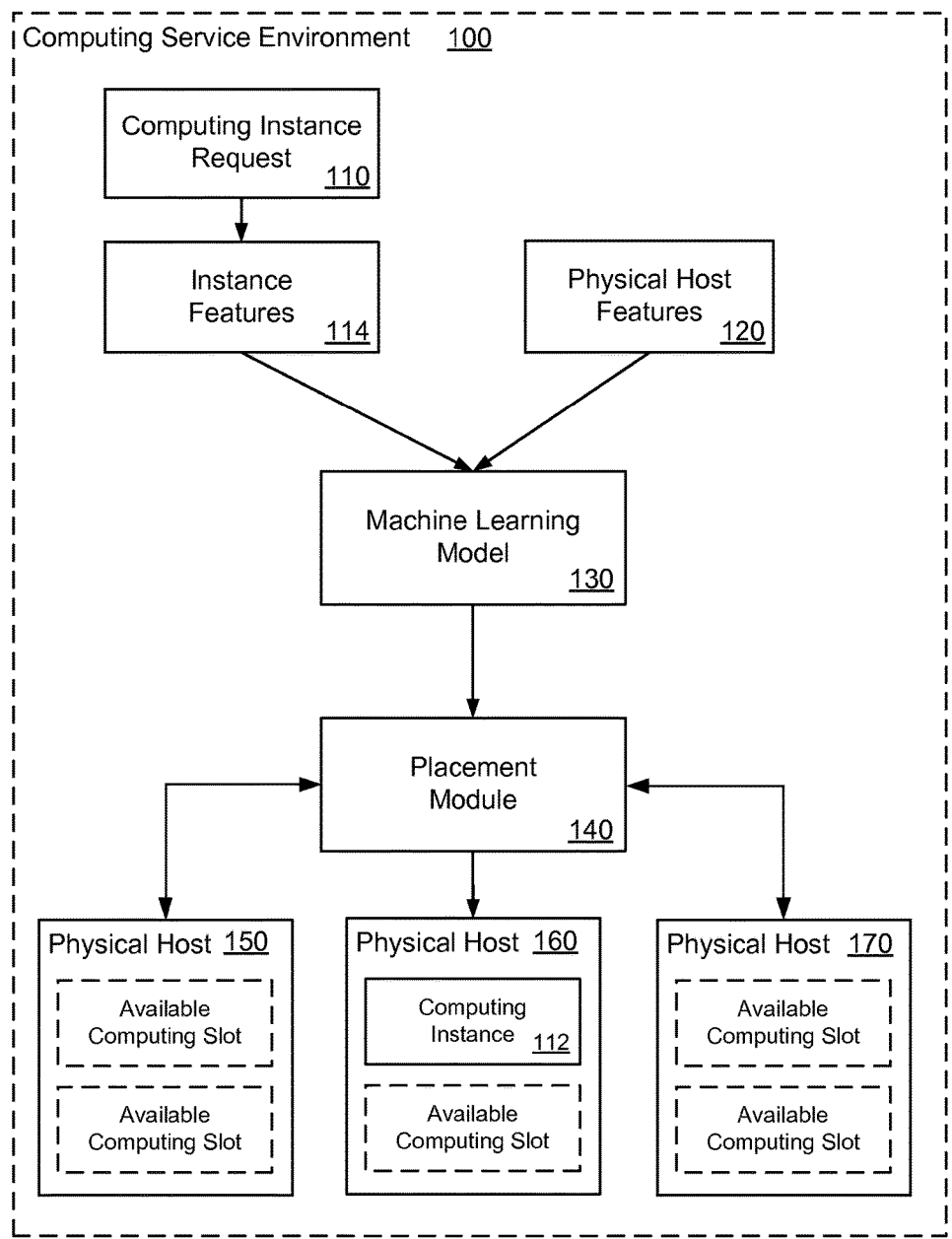
FIG. 1 illustrates a system and related operations for placing a computing instance on a physical host in a computing service environment using estimated launch times according to an example of the present technology.

Technology is described for determining the placement of a computing instance within physical hosts in a computing service environment using estimated launch times. During placement of the computing instance, a physical host having available computing slots (e.g., computing resources used to launch the computing instance) or a group of physical hosts providing reduced launch times may be identified in the computing service environment using the estimated launch times and other placement criteria. The computing instance may be placed onto the physical host, also known as a server computer, and the computing instance may be launched or executed on the physical host within the computing service environment.

In one example, a request to launch a computing instance in the computing service environment may be received. The request may be received from a customer who desires computing services from the computing service environment. A determination as to which physical host in the computing service environment is to provide placement for the computing instance may be performed upon receiving the request to launch the computing instance from the customer. For instance, the physical host offering a reduced launch time for the computing instance, as compared to other physical hosts in the computing service environment may be identified, and the computing instance may be launched on that physical host. Thus, the computing instance may be placed on the physical host offering the reduced launch time for the computing instance. The term "launch time" may generally refer to a period of time between 1) receiving the request to launch the computing instance and 2) booting the computing instance on the physical host that is selected to launch the computing instance.

In one configuration, instance features associated with the computing instance involved in the request may be identified when determining placement for the computing instance or a machine image from which the computing instance may be generated. The instance features may describe or characterize the computing instance. For example, the instance features may include, but are not limited to, a size of the computing instance, a computing instance image type used by the computing instance (e.g., a machine image or a kernel image), an architecture type of the computing instance (e.g., a 32-bit architecture or a 64-bit architecture), a virtualization type of the computing instance (e.g., paravirtualization or a hardware virtual machine), and a type of data store used by the computing instance. The instance features may include user-controlled features, such as a type of operating system (OS) and a networking type (e.g., virtual private network) used for launching the computing instance.

In one configuration, physical host features associated with the physical hosts in the computing service environment may be identified when determining a placement for the computing instance. The physical host features may describe or characterize aspects of the physical hosts in the computing service environment at a given time (e.g., when the computing instance is to be launched). Alternatively, the physical host features may describe a defined group of physical hosts in the computing service environment. The physical host features may include, but are not limited to, a maximum number of computing instances that can be hosted at the physical host, a hardware type associated with the physical host, a hardware vendor associated with the physical host, a percentage occupancy for computing instances at the physical host when the computing instance is to be launched and a zone in which the physical host is located. In addition, the physical host features may include a number of computing instances that are currently pending and/or a running on the physical host.

The instance features associated with the computing instance and the physical host features associated with the physical hosts in the computing environment may be provided to a launch time prediction model. The launch time prediction model may predict an estimated launch time for launching the computing instance on a physical host in the computing service environment using the instance features and the physical host features. More specifically, the launch time prediction model may predict the estimated launch time for launching the computing instance on Physical Host A, the estimated launch time for launching the computing instance on Physical Host B, the estimated launch time for launching the computing instance on Physical Host C, and so on. The launch time prediction model may be a machine learning model (e.g., a regression model) that has been trained using historical launch time information and features for a plurality of previously launched computing instances in order to predict the estimated launch time for the computing instance to be launched in the computing service environment.

As a non-limiting example of instance features, a computing instance to be launched in the computing service environment may: be relatively small in size, consist of a 32-bit architecture, use a hardware virtual machine (HVM), and/or use a defined type of data store. The computing instance may be launched on Physical Host A, Physical Host B, or Physical Host C. Physical Host A may be 80% occupied (i.e., 80% of the computing resources for Physical Host A are currently being used) and is currently launching ten other computing instances. Physical Host B may be 50% occupied and is currently launching six other computing instances. Physical Host C may be 20% occupied and is currently launching two other computing instances. The launch time prediction model may receive the identified features and determine that the estimated launch time for launching the computing instance on Physical Host A is 70 seconds, the estimated launch time for launching the computing instance on Physical Host B is 40 seconds, and the estimated launch time for launching the computing instance on Physical Host C is 15 seconds. Therefore, the estimated launch times may be considered when determining which physical host is to provide placement for the computing instance.

In the example above, the physical host that can offer the reduced launch time, as compared to other physical hosts, may be selected for placement of the computing instance. In the example described above, Physical Host C may be selected to launch the computing instance because Physical Host C may provide the reduced launch time as compared to Physical Host A and Physical Host B.

In an alternative configuration, the physical host selected for placement of the computing instance may have a fewest number of computing instances that are simultaneously being launched as compared to other physical hosts in the computing service environment, because the number of simultaneous launches on the physical host may increase the launch time for launching the computing instance. As a non-limiting example, at the time when the placement decision is being performed, Physical Host A may be launching ten computing instances, Physical Host B may be launching two computing instances, and Physical Host C may be launching a hundred computing instances. Therefore, Physical Host B may be selected to launch the computing instance because Physical Host B may be inferred to provide the lowest launch time as compared to Physical Host A and Physical Host C.

The estimated launch time for the computing instance may be one of numerous placement factors used when determining placement for the computing instance. For example, other factors related to placement of the computing instance may include physical host utilization, licensing costs, disaster impact, etc. The placement factors, including the estimated launch time, may each be assigned a weighting value related to an importance level of the placement factor. For example, the estimated launch time may account for 50% of the placement decision, the physical host utilization may account for 30% of the placement decision, the licensing costs may account for 20% of the placement decision, and the disaster impact may account for 10% of the placement decision.

FIG. 1 is a diagram that illustrates placing a computing instance 112 within a computing service environment 100. A computing instance request 110 to launch the computing instance 112 may be received by the computing service environment 100 from a customer or user. Instance features 114 associated with the computing instance 112 to be launched in response to the computing instance request 110 may be identified. The instance features 114 may include a size of the computing instance 112, a machine image used by the computing instance 112, an architecture type of the computing instance 112, a virtualization type of the computing instance 112, a type of data store used by the computing instance 112 (e.g. a block data store, an instance store, or a bucket type data store), etc. In addition, physical host features 120 for a plurality of physical hosts in the computing service environment 100 may be identified. The physical host features 120 may include, for each physical host in the computing service environment 100, a maximum number of computing instances that can be hosted on the physical host, a hardware type, a hardware vendor, a percentage of occupancy, a geographical zone in which the physical host is located, a number of currently pending or running instances on the physical host, etc.

The instance features 114 associated with the computing instance 112 and the physical host features 120 associated with the plurality of physical hosts in the computing service environment 100 may be provided to a machine learning model 130. As an example, the machine learning model 130 may be a regression model that predicts an estimated launch time for launching the computing instance 110 on a given physical host based on the instance features 114 and the physical host features 120. The machine learning model 130 may provide the estimated launch times calculated by the machine learning model 130 to a placement module 140. The placement module 140 may determine which physical host (e.g., physical host 150, physical host 160 or physical host 170) is to place the computing instance using the estimated launch times. In one example, the placement module 140 may select the physical host for placement that provides a reduced launch time as compared to the other physical hosts in the computing service environment 100. In another example, the placement module 140 may select the physical host for placement that provides a lowest launch time as compared to the other physical hosts in the computing service environment 100. In an alternative example, the placement module may use the launch times estimated for the physical hosts 150-170 as a factor in determining the placement and include other factors such as physical host utilization, licensing costs, disaster impact, etc.

As a non-limiting example, the machine learning model 130 may predict that the computing instance 112 can be launched on the physical host 150 in two minutes, the physical host 160 in 30 seconds, or the physical host 170 in five minutes. The machine learning model 130 may provide these estimated launch times to the placement module 140. The placement module 140 may select the physical host 160 for placement of the computing instance because the physical host 160 provides the reduced launch time as compared to the physical host 150 and the physical host 170.

Figure 2:
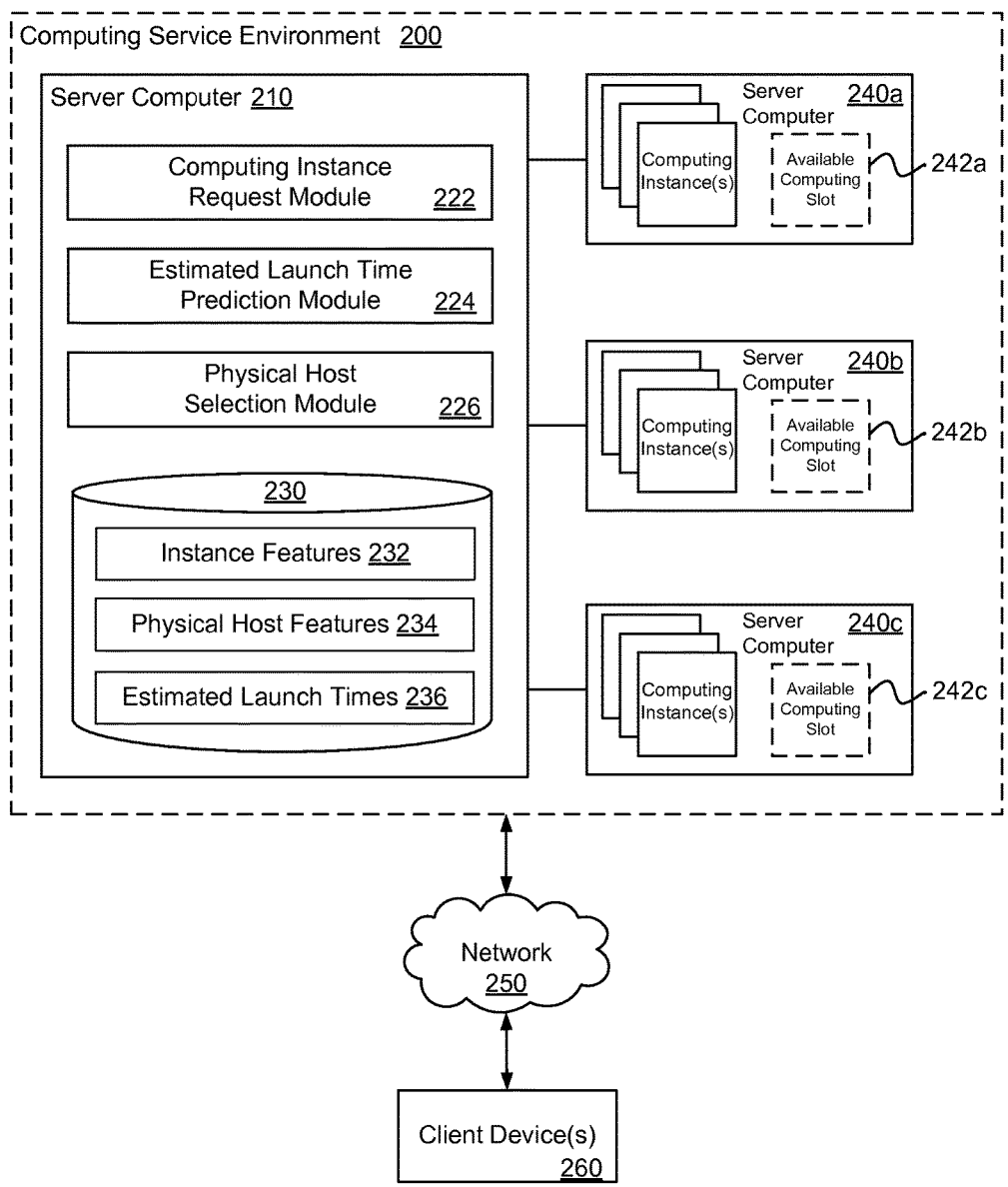
FIG. 2 is a block diagram that illustrates various components included in a system for placing a computing instance on a physical host in a computing service environment using estimated launch times according to an example of the present technology.

FIG. 2 illustrates components of an example computing service environment 200 according to one example of the present technology. The computing service environment 200 may include a server computer 210 in communication with a number of client devices 260 via a network 250, and the server computer may be part of the control plane for the service provider environment 200. The server computer 210 may contain a data store 230 and a number of modules used to determine a placement of a computing instance. In addition, the computing service environment 200 may include a number of server computers 240a-c executing a plurality of computing instances.

The server computers 240a-c may have available computing slots 242a-c (e.g., idle computing resources) that may be used to execute a computing instance. The available computing slots 242a-c may be allocated to customers who may then utilize an available computing slot 242a-c to execute a computing instance. Examples of computing instances may include on-demand computing instances, reserved computing instances and interruptible computing instances. An on-demand computing instance may be a computing instance that a customer may purchase and execute upon request. A reserved computing instance may be a reservation for a computing instance that a customer may purchase for a defined period of time making the computing instance available when the customer requests the computing instance, and an interruptible computing instance may be a computing instance that may be executed in a computing slot 242a-c not being used by another computing instance type unless the price being paid for the interruptible computing instance falls below a current bid price.

The data stored in the data store 230 may include instance features 232. The instance features 232 may be associated with the computing instance to be launched in the computing service environment 200. In addition, the instance features 232 may be associated with the computing instance image from which the computing instance is launched in the computing service environment 200. The instance features 232 may describe or characterize the computing instance that is to be launched in the computing service environment 200. For example, the instance features may have numerical values or other scalar values.

The data stored in the data store 230 may include physical host features 234. The physical host features 234 may be associated with the plurality of physical hosts in the computing service environment 200. The physical host features 234 may describe or characterize the physical hosts in the computing service environment 200 that potentially may launch the computing instance. For example, the physical host features 234 may have numerical values or other scalar values.

The data stored in the data store 230 may include estimated launch times 236. The estimated launch times 236 may be for a plurality of computing instances to be launched in the computing service environment 200. The estimated launch times 236 may indicate, for a given computing instance, an estimated launch time to launch the computing instance on each physical host (or server computer) in a plurality of physical hosts in the computing service environment 200. The estimated launch times 236 may be stored in the data store 230 for quality control purposes, record keeping or other uses. The estimated launch times 236 may be determined using a launch time prediction model. In one example, the launch time prediction model may use the instance features 232 associated with the computing instance and the physical host features 234 associated with the plurality of physical hosts when determining the estimated launch times 236. As a non-limiting example, the estimated launch times 236 for launching a computing instance on three distinct physical hosts may be 10 seconds, 50 seconds or two minutes, respectively.

The server computer 210 may include a computing instance request module 222, an estimated launch time prediction module 224, a physical host selection module 226, and other applications, services, processes, systems, engines, or functionality not discussed in detail herein. The computing instance request module 222 may be configured to receive a request to launch one or more computing instances in the computing service environment 200. The request may be received from a customer who desires computing services from the computing service environment 200. The request may include a number of computing instances to be launched and a type or size of the computing instances to be launched. In one example, the request may specify a particular geographical region or zone to launch the computing instances.

The estimated launch time prediction module 224 may be configured to receive or identify instance features associated with the computing instances in the request and physical host features associated with the plurality of physical hosts in the computing service environment 200. The instance features may include a size of the computing instance, a machine image used to launch the computing instance, an architecture type of the computing instance, a virtualization type of the computing instance, a type of data store used by the computing instance, etc. In addition, the physical host features may include, for each physical host in the computing service environment 200 or for a defined group of physical hosts in the computing service environment 200, a maximum number of computing instances that can be hosted on the physical host, a hardware type, a hardware vendor, a percentage of occupancy, a geographical zone in which the physical host is located, a number of currently pending or running instances on the physical host, etc.

The estimated launch time prediction module 224 may identify the estimated launch times for launching the computing instance in the computing service environment 200. The estimated launch time prediction module 224 may identify the estimated launch times using a machine learning model. The machine learning model may predict the estimated launch times given the instance features and the physical host features. The instance features and the physical host features may affect the estimated launch times for the computing instance. For example, certain instance features and/or physical host features (e.g., a number of simultaneous computing instance launches on the physical host, a size of the computing instance) may increase the estimated launch times for the computing instance, whereas other instance features and/or physical host features may decrease the estimated launch times for the computing instance. In one example, the machine learning model may be a regression model that uses historical launch time information for a plurality of previously launched computing instances to predict the estimated launch time for the computing instance to be launched in the computing service environment 200.

The physical host selection module 226 may be configured to select a physical host from a group of physical hosts in the computing service environment 200 that can provide placement of the computing instance. The physical host selection module 226 may select the physical host based on the estimated launch times for the computing instance. In one example, the physical host selection module 226 may select the physical host that can provide placement of the computing instance at a reduced estimated launch time or a lowest estimated launch time as compared to other physical hosts in the group of physical hosts. In addition, the physical host selection module 226 may use additional placement factors when determining placement for the computing instance. The additional factors may include, but are not limited to, physical host utilization, licensing costs, and a disaster impact. The estimated launch times and the additional placement factors may each be assigned a weighting value that correlates to an importance level of the placement factor when determining placement for the computing instance. The computing instance may be loaded and executed on the physical host upon placement in order to provide computing services to the customer.

The client device 260 may be utilized by a customer to request a computing instance and to control an executing computing instance. The client device 260 may include any device capable of sending and receiving data over the network 250. The client device 260 may comprise, for example a processor-based system such as a computing device. The client device 260 may be a device such as, but not limited to, a desktop computer, laptop or notebook computer, tablet computer, mainframe computer system, handheld computer, workstation, network computer, or other devices with like capability.

The various processes and/or other functionality contained within the computing service environment 200 may be executed on one or more processors that are in communication with one or more memory modules. The computing service environment 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
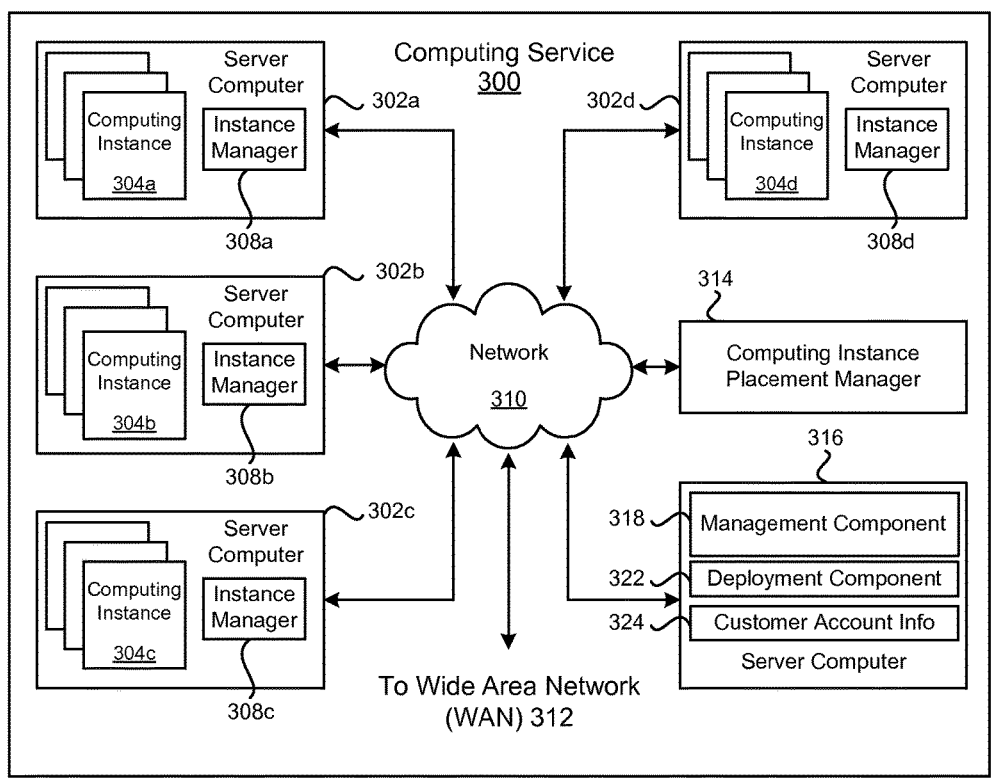
FIG. 3 is a block diagram of a computing service environment according to an example of the present technology.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e., a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a computing instance placement manager that may perform functions, such as querying the server computers 302a-d for available computing slots and computing group state information, as well as determining a placement of a computing instance 304a-d in an available computing slot. In addition, the server computer 314 may include functionality of the server computer 210.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
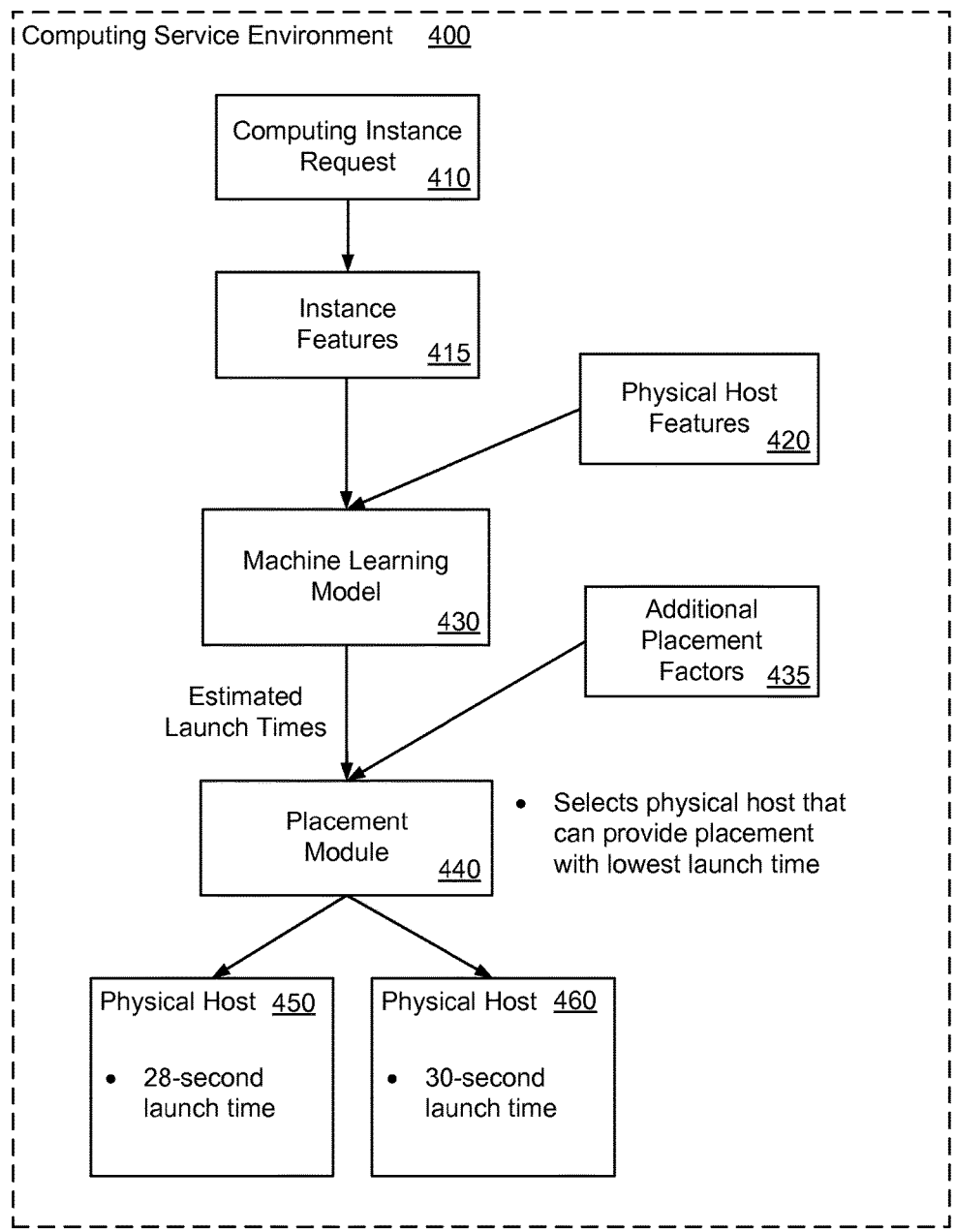
FIG. 4 illustrates a system and related operations for placing a computing instance on a physical host in a computing service environment using estimated launch times according to an example of the present technology.

FIG. 4 illustrates an exemplary system and related operations for placing a computing instance on a physical host in a computing service environment 400. The computing instance may be launched in order to provide computing services upon placement onto the physical host. A computing instance request 410 to launch the computing instance may be received at the computing service environment 400. For example, a customer may perform the computing instance request 410 in order to obtain the computing services from the computing service environment 400. The physical host on which the computing instance is placed may be selected according to a predetermined objective. The predetermined objective may be defined by the customer and/or the computing service environment 400. In one example, the predetermined objective may include placing the computing instance on a physical host that can provide a fastest launch time as compared to other physical hosts in the computing service environment 400.

Instance features 415 associated with the soon to be launched computing instance included in the computing instance request 410 and physical host features 420 for a plurality of physical hosts in the computing service environment 400 may be identified. For example, the physical hosts 450-460 may be directly queried for data corresponding to the physical host features 420. The instance features 415 and the physical host features 420 may describe the computing instance and the physical hosts 450-460 in the computing service environment 400, respectively. The identification of the instance features 415 and the physical host features 420 may enable placement of the computing instance onto the physical host. More specifically, the physical host that is selected for placement may depend on the instance features 415 and the physical host features 420. As previously described, the instance features 415 may include a size of the computing instance, a machine image used by the computing instance, an architecture type of the computing instance, a virtualization type of the computing instance, a type of data store used by the computing instance, etc. In addition, the physical host features 420 may include, for each physical host in the computing service environment 400 or for a defined group of physical hosts in the computing service environment 400, a maximum number of computing instances that can be hosted on the physical host, a hardware type, a hardware vendor, a percentage of occupancy, a geographical zone in which the physical host is located, a number of currently pending or running instances on the physical host, etc.

The instance features 415 and the physical host features 420 may be provided to a machine learning model 430. The machine learning model 430 may be a regression model that predicts an estimated launch time for launching the computing instance on a given physical host based on the instance features 415 and the physical host features 420. The machine learning model 430 may have been trained using historical information for previously launched computing instances (e.g., types of computing instances that were previously launched, launch times for the computing instances, the number of simultaneous launches on the physical hosts that launched the computing instances, etc.) in order to predict the estimated launch time for the computing instance.

In one example, the machine learning model 430 may predict the estimated launch times for launching the computing instance on each of the available physical hosts in the computing service environment 400. Alternatively, the machine learning model 430 may predict the estimated launch times for launching the computing instance on individual physical hosts in a defined group of physical hosts. For example, the machine learning model 430 may predict the estimated launch time for launching the computing instance on a physical host 450, as well as the estimated launch time for launching the computing instance on a physical host 460.

The machine learning model 430 may provide the estimated launch times to a placement module 440. The placement module 440 may use the estimated launch times when performing a placement decision for the computing instance (i.e., which physical host is to host or launch the computing instance). In addition, the placement module 440 may use additional placement factors 435 when performing the placement decision. The additional placement factors 435 may include, but are not limited to, a physical host utilization placement factor, a licensing cost placement factor and a disaster impact placement factor. The physical host utilization placement factor may represent a predetermined objective of maximizing physical host utilization among the physical hosts included in the computing service environment 400. The licensing placement factor may represent a predetermined objective of minimizing software licensing costs associated with the placement of computing instances on the physical hosts included in the computing service environment 400. The disaster impact placement factor may represent a predetermined objective of minimizing an impact of computing service failure (e.g., physical host failure, rack failure, availability zone failure or hardware failure) on a customer's executing computing instances.

The estimated launch times determined by the machine learning model 430, as well as the additional placement factors 435, may each be assigned a weighting value indicating a respective importance of the placement factor when determining placement of the computing instance. In other words, the weighting value may be assigned to each of the placement factors according to how the computing service environment 400 may be affected by the placement of a computing instance. For example, where maintaining high physical host utilization is desired, the physical host utilization factor may receive a relatively high weighting value. In a case where optimizing the software licensing costs is of lesser value to the computing service environment, the licensing cost placement factor may receive a lower weighting value as compared to the weighting value assigned to the utilization placement factor. In a case where placement of the computing instance in an overall computing service environment 400 may currently have a negative effect on a number of customers impacted due to a system failure, a weighting value assigned to the disaster impact placement factor may be a relatively high value. As a non-limiting example, the estimated launch times for the computing instance may be weighted 50% when the placement module 440 performs the placement decision, the physical host utilization placement factor may be weighted 20%, the licensing cost placement factor may be weighted 15%, and a disaster impact placement factor may be weighted 15%.

The placement module 440 may receive the estimated launch times for launching the computing instance from the machine learning model 430, as well as the additional placement factors 435. The placement module 440 may determine which physical host is to receive the computing instance in order to comply with the predetermined objectives of the computing service environment 400. In one example, the placement module 440 may select the physical host for placement that provides a reduced launch time or a lowest launch time for the computing instance.

As a non-limiting example, the placement module 440 may determine that the physical host 450 can launch the computing instance in 28 seconds. In addition, the placement module 440 may determine that the physical host 460 can launch the computing instance in 30 seconds. The placement module 440 may select the physical host 450 for placement of the computing instance because the physical host 450 provides a lower launch time.

In one configuration, the physical host to provide placement of the computing instance may be selected using placement constraints included in the computing instance request 410. In one example, the customer requesting the computing instance to be launched may provide the placement constraints. The placement constraints may indicate whether or not the computing instance request 410 is a plan for launching a cluster of computing instances. The placement constraints may indicate specific types of hardware, operating systems or networking types to be used when launching the computing instance. In addition, the placement constraints may indicate whether the computing instances are to be launched in a group of physical hosts that are relatively close to each other, as opposed to a group of physical hosts that are relatively spread apart.

Figure 5:
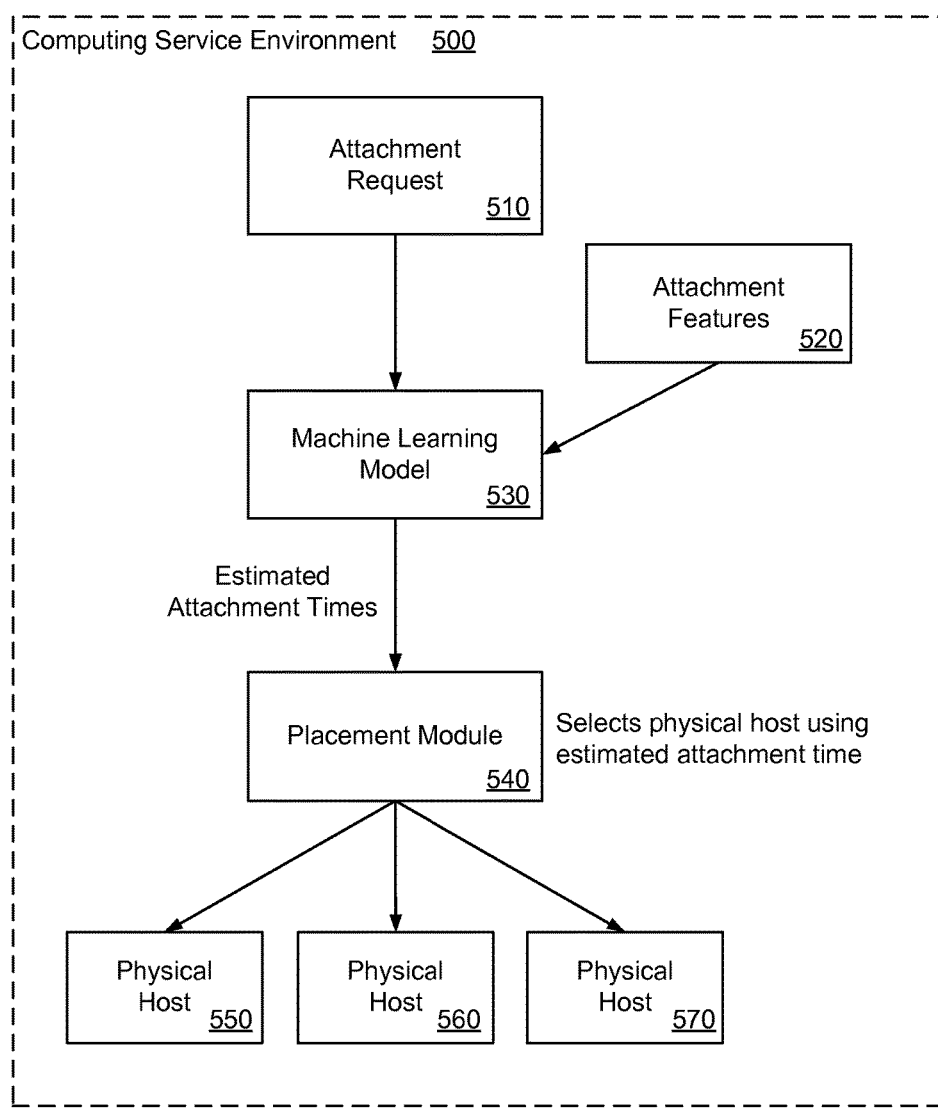
FIG. 5 illustrates a system and related operations for using an estimated attachment time to determine placement for a computing instance in a computing service environment according to an example of the present technology.

FIG. 5 illustrates an exemplary system and related operations for using an estimated attachment time when determining placement for a computing instance in a computing service environment 500. A request to launch the computing instance may be received (e.g., from a customer). In one example, the request may include an attachment request 510. The attachment request 510 may be to attach a network interface and/or network storage to the computing instance when the computing instance is launched. Since a number of attachments and/or the size of the attachments used when launching the computing instance may affect a launch time of the computing instance, attachment times may be considered when performing a placement decision for the computing instance.

In one example, a machine learning model 530 may predict estimated attachment times, i.e., an amount of time to perform the attachment. The machine learning model 530 may use the attachment request 510, as well as attachment features 520 associated with the attachment request 510, when predicting the estimated attachment times. The attachment features may include, but are not limited to, a number of attachments included in the attachment request 510, a size of the attachments, whether the attachment relates to data storage or a network interface, etc. In one example, the machine learning model 530 may be a regression model that predicts the estimated attachment times using historical information relating to past attachment requests.

The machine learning model 530 may provide the estimated attachment times to a placement module 540. The placement module 540 may select a physical host for placement of the computing instance based on the estimated attachment times. For example, the placement module 540 may place the computing instance on one of a physical host 550, a physical host 560, or a physical host 570 depending on the estimated attachment times. In one example, the placement module 540 may select the physical host that can provide placement of the computing instance with a reduced estimated attachment time.

In another configuration, the customer may request an ad hoc attachment (i.e., a request for additional storage after the computing instance has been launched). The machine learning model 530 may predict an estimated amount of time to obtain the additional storage based on characteristics of the ad hoc attachment request, such as a size of the additional storage in the request, etc. In other words, the machine learning model 530 may determine the estimated amount of time to obtain the additional storage based on past additional storage requests. In one example, the estimated amount of time to provide the additional storage may be provided to the customer via a user interface.

Figure 6:
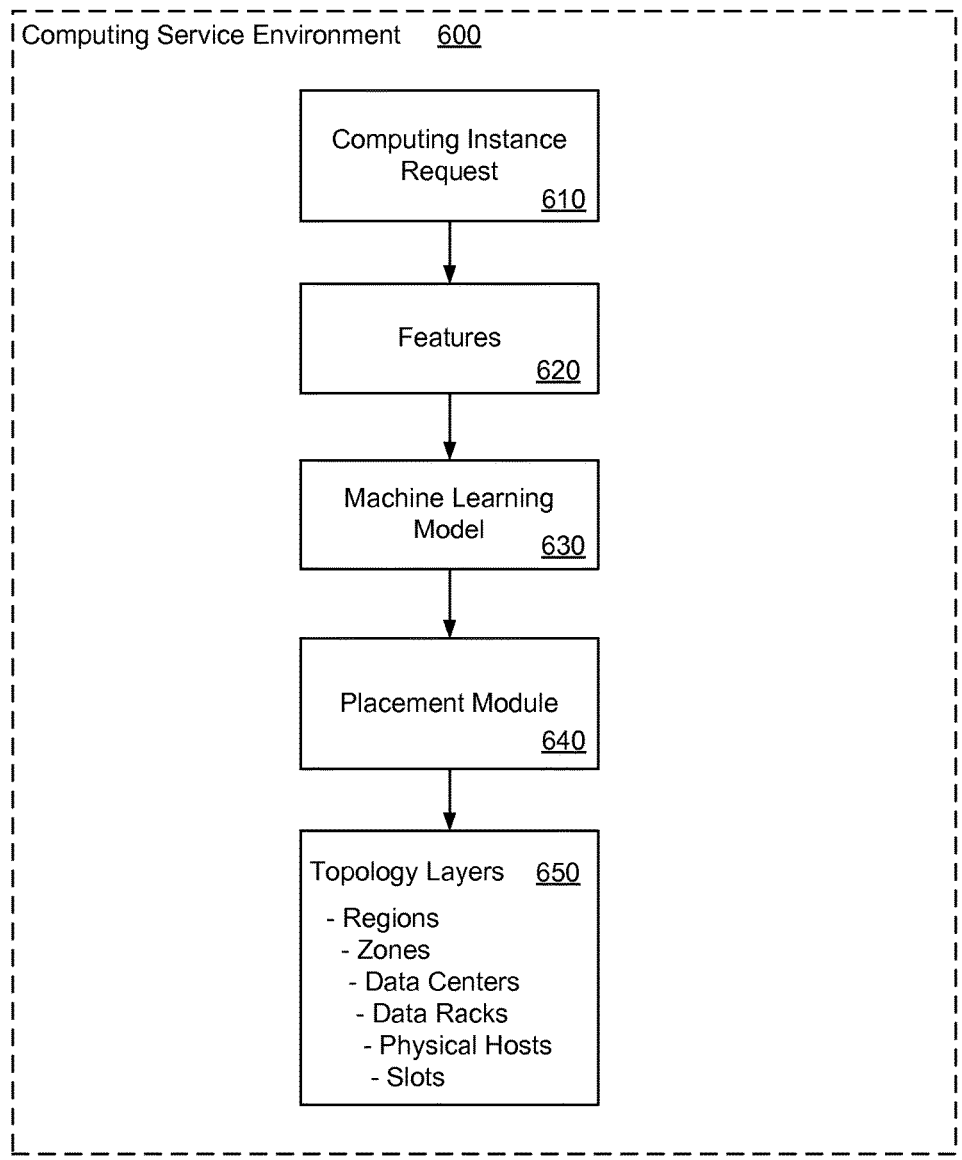
FIG. 6 illustrates a system and related operations for placement of a computing instance in a computing service environment using estimated launch times according to an example of the present technology.

FIG. 6 illustrates an exemplary system and related operations for placing a computing instance on a physical host (e.g., server) in a physical or geographical area that is selected from at least one of a plurality of topology layers 650 in a computing service environment 600. A computing instance request 610 to launch the computing instance may be received from a customer. Features 620 associated with the computing instance and physical hosts in the computing service environment 600 may be provided to a machine learning model 630. The machine learning model 630 may determine estimated launch times for launching the computing instance on physical hosts in individual areas within varying topology layers 650, such as a physical host in a particular geographical region, zone, data center, data rack, physical host, computing slot, etc. In one example, the geographical region may include a plurality of zones, each zone may include a plurality of data centers, each data center may include a plurality of data racks, each data rack may include a plurality of physical hosts, and each physical host may include a plurality of computing slots. The machine learning model 630 may determine whether placing the computing instance on a physical host in particular topology layers 650 could result in an improved launch time. For example, the machine learning model 630 may indicate that placing the computing instance on a physical host in a first data center in a particular zone may result in a faster launch time as compared to placing the computing instance in a second data center in the particular zone. The machine learning model 630 may communicate the estimated launch times for the topology layers 630 to a placement module 640. The placement module 640 may use the estimated launch times when determining placement for the computing instance (i.e., choosing which topology layer 650 is to host the computing instance).

Figure 7:
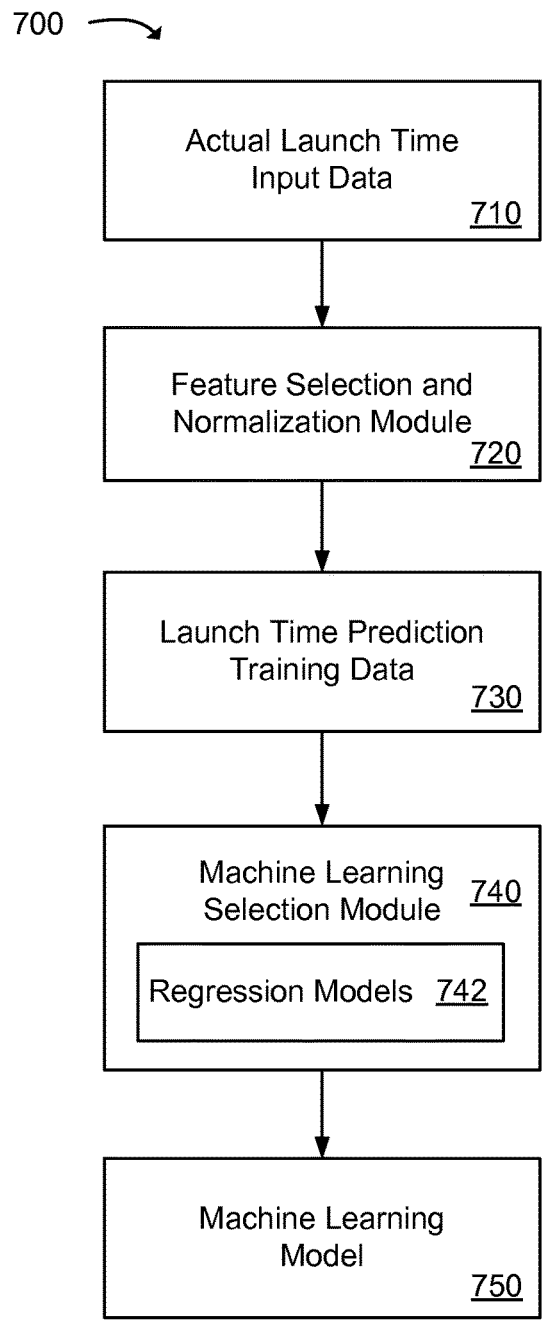
FIG. 7 is a block diagram that illustrates generating a launch time prediction model for predicting launch times for computing instances launched in a computing service environment according to an example of the present technology.

FIG. 7 is an exemplary block diagram 700 that illustrates generating a machine learning model 750 to predict launch times for computing instances that are launched in a computing service environment. The machine learning model 750 may be created using actual launch time prediction data 710. The actual launch time input data 710 may include information (e.g., launch metrics) for a plurality of computing instances that have been previously launched in the computing service environment. So, the actual launch time input data 710 may include historical information relating to previously launched computing instances in the computing service environment. In addition, the actual launch time input data 710 may include historical information for a plurality of physical hosts in the computing service environment. The actual launch time input data 710 may be transformed to be used to train the machine learning model 750, as discussed later.

As a non-limiting example, the actual launch time input data 710 may indicate that computing instance A took 60 seconds to launch, while computing instance A was relatively large in size, used a first type of data store, used a 32-bit architecture, and launched on a physical host that was simultaneously launching five other computing instances. As another non-limiting example, the actual launch time input data 710 may indicate that Computing Instance B took 15 seconds to launch, while Computing Instance B was relatively small in size, used a second type of data store, used a 64-bit architecture, and launched on a physical host that was not simultaneously launch other computing instances.

The actual launch time input data 710 may be provided to a feature selection and normalization module 720. The feature selection and normalization module 720 may convert the actual launch time input data 710 into model features. In other words, the model features may relate to characteristics of the computing instances that were previously launched and characteristics of the physical hosts upon which the computing instances were previously launched. The model features may be classified as instance features and physical host features.

The instance features may include, but are not limited to, sizes of the computing instances, machine images used by the computing instance (e.g., a machine images or kernel images), architecture types of the computing instances (e.g., 32-bit architectures or 64-bit architectures), virtualization types of the computing instances (e.g., paravirtualization or hardware virtual machines), and types of data stores used by the computing instances. The instance features may include user-controlled features, such as type of operating systems (OS) and networking types (e.g., virtual private cloud) used for launching the computing instances.

The physical host features may include, but are not limited to, a maximum number of computing instances the physical host can host, a hardware type associated with the physical host, a hardware vendor associated with the physical host, a percentage occupancy at the physical host when the computing instance is to be launched, and a zone in which the physical host is located. The physical host features may include an average, minimum and maximum number of pending computing instances and/or running computing instances on the physical host that launches the computing instance (i.e., a target physical host). In addition, the physical host features may include a number of computing instances that are currently in a pending state and/or a running state on the physical host that launches the computing instance (i.e., the target physical host).

The feature selection and normalization module 720 may normalize the model features (i.e., adjust values measured on different scales to a notionally common scale) in order to create launch time prediction training data 730. The launch time prediction training data 730 may represent aggregated features for the plurality of computing instances identified in the launch time prediction input data 710. The launch time prediction training data 730 may be provided to a machine learning selection module 740. The machine learning selection module 740 may use the launch time prediction training data 730 to train various machine learning models 742. For example, a regression model may be trained. The regression models 742 may include, but are not limited to, support vector machines, stochastic gradient descent, adaptive boosting, extra trees, and random forest. The various regression models 742 may correspond to the launch time prediction training data 730 with various levels of success. In one example, a random forest regressor may provide a relatively high rate of accuracy with respect to the launch time prediction training data 730, and therefore, the machine learning selection module 740 may use the random forest regressor when estimating launch times for computing instances.

The machine learning model 750 may receive a request to launch a computing instance, and based on the instance features and the physical host features associated with the computing instance, the machine learning model 750 may predict the launch time for the computing instance. In one example, the machine learning model 750 may determine that the number of simultaneous computing instance launches on the same physical host, the type of data stored used by the computing instance, the architecture type used by the computing instance and the computing instance image associated with the computing instance may have a greater effect on the launch time for the computing instance as compared to the other model features.

In some cases, the predicted launch time from the computing instance may diverge from an actual launch time of the computing instance. The instance features and the physical host features associated with the computing instance, as well as the actual launch time to launch the computing instance, may be used to further train the machine learning model 750 in order to improve future launch time predictions.

Figure 8:
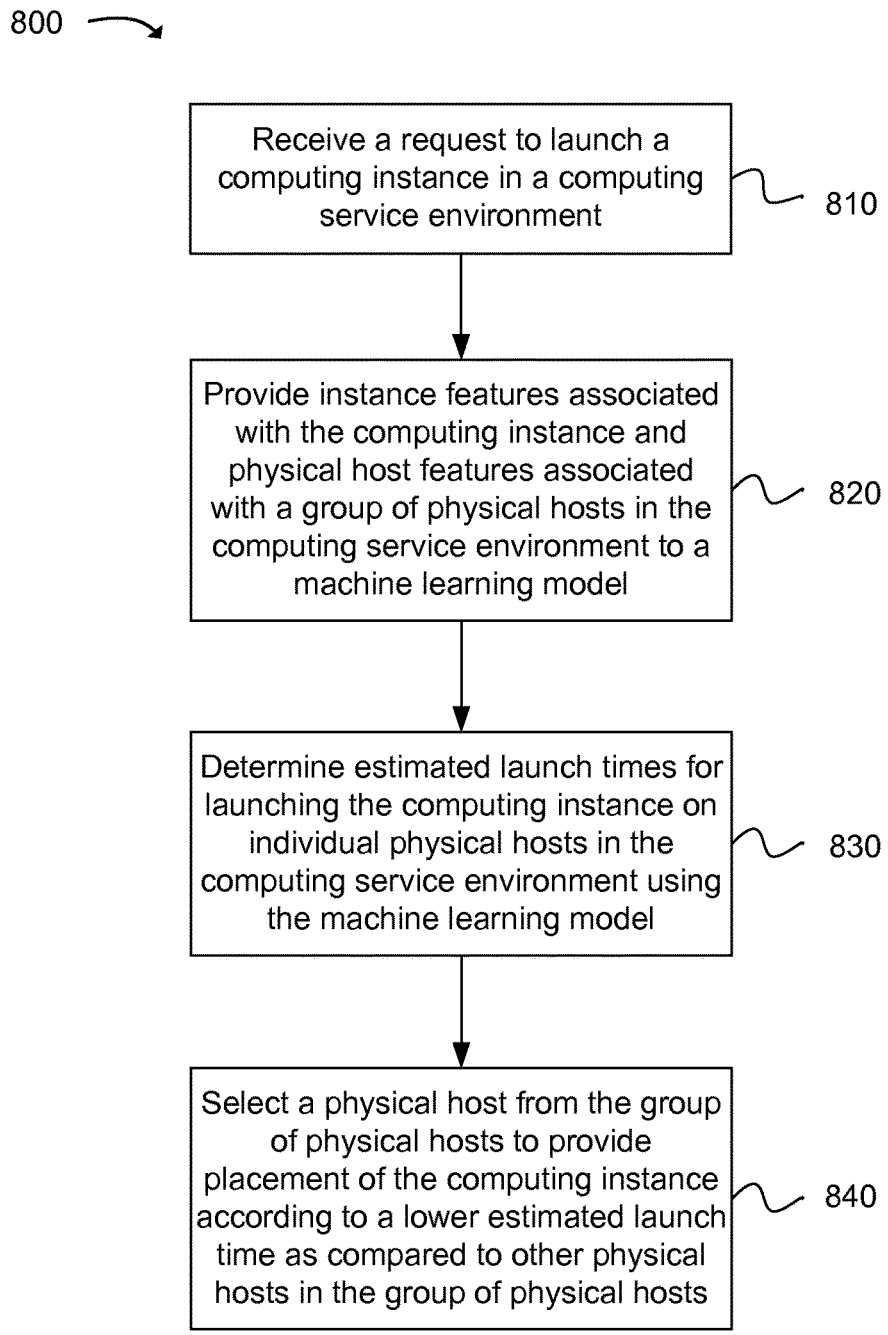
FIG. 8 is a flowchart of an example method for determining computing instance placement using estimated launch times within a computing service environment.

FIG. 8 is a flow diagram illustrating an example method for determining computing instance placement within a computing service environment. A request to launch a computing instance in a computing service environment may be received, as in block 810. The request to launch the computing instance may be received from a customer who desires computing services from the computing service environment.

Instance features associated with the computing instance and physical host features associated with a group of physical hosts in the computing service environment may be provided to a machine learning model, as in block 820. The instance features may describe or characterize the computing instance to be launched according to the request. The physical host features may describe or characterize each physical host in the computing service environment at a given time (i.e., when the computing instance is to be launched in accordance with the request).

Estimated launch times for launching the computing instance on individual physical hosts in the computing service environment may be determined using the machine learning model, as in block 830. The machine learning model may predict the estimated launch times given the instance features and the physical host features. In one example, the machine learning model may be a regression model that uses historical launch time information for a plurality of previously launched computing instances to predict the estimated launch time for the computing instance to be launched in the computing service environment.

A physical host from the group of physical hosts may be selected to provide placement of the computing instance according to a lower estimated launch time as compared to other physical hosts in the group of physical hosts, as in block 840. In addition, the physical host to provide placement of the computing instance may be selected using placement constraints included in the request to launch the computing instance. The estimated launch times may be one of a plurality of placement factors used when selecting the physical host for placement of the computing instance. In one example, a weighting value may be assigned to the estimated launch times for the computing instance when the placement is determined using the plurality of placement factors, and the physical host that is to provide the placement of the computing instance may be selected based in part on the weighting value assigned to the estimated launch times.

Figure 9:
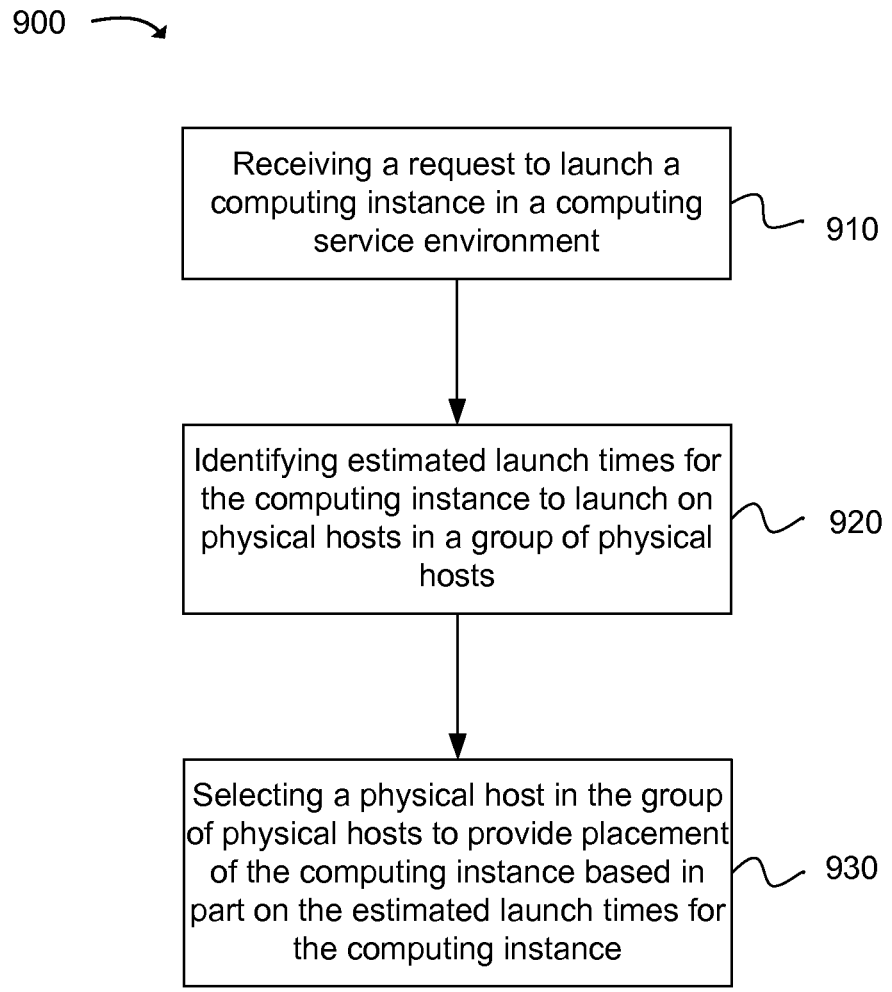
FIG. 9 is a flowchart of another example method for determining computing instance placement using estimated launch times within a computing service environment.

FIG. 9 is a flow diagram illustrating another example method for determining computing instance placement within a computing service environment. A request to launch a computing instance in a computing service environment may be received, as in block 910. The request to launch the computing instance may be received from a customer requesting computing services from the computing service environment.

Estimated launch time for launching the computing instance on physical hosts in a group of physical hosts may be identified, as in block 920. The estimated launch times may include a period of time between receiving a computing instance launch request from the customer and booting the computing instance on the physical host. The estimated launch times for launching the computing instance may be identified using a regression model that predicts launch times for computing instances. The estimated launch times for launching the computing instance may be identified based on instance features associated with the computing instance and physical host features associated with the physical hosts in the group of physical hosts, wherein the instance features associated with the computing instance includes user selected features.

A physical host in the group of physical hosts may be selected to provide placement of the computing instance based in part on the estimated launch times for the computing instance and may optionally include additional factors related to placement of the computing instance, as in block 930. The additional factors related to placement of the computing instance may include a physical host utilization placement factor, a licensing cost placement factor and a disaster impact placement factor. The computing instance may be loaded on the physical host in order to provide a computing service.

In one configuration, the estimated launch times for the computing instance on each physical host may be compared with the estimated launch times for the other physical hosts in the group of physical hosts. The physical host in the group of physical hosts that can provide placement of the computing instance with a lower estimated launch time as compared with the other physical hosts in the group of physical hosts may be selected. Alternatively, the physical host that includes a lower number of computing instances being simultaneously launched as compared to other physical hosts in the group of physical hosts may be selected. In one example, the physical host selected to execute the computing instance may be verified to not be simultaneously executing a number of computing instances that exceeds a predetermined threshold In another configuration, a region or a zone may be selected for placement of the computing instance based in part on the estimated launch times for computing instances in the region or zone. In one example, a weighting value may be assigned to the estimated launch times for the computing instance when the placement of the computing instance is determined using a plurality of placement factors, and the physical host for placement of the computing instance may be selected based in part on the weighting value assigned to the estimated launch times. In addition, an estimated amount of time to launch an attachment associated with the computing instance may be identified, and the physical host that can provide placement of the computing instance with a lower estimated attachment time as compared to other physical hosts in the group of physical hosts may be selected.

Figure 10:
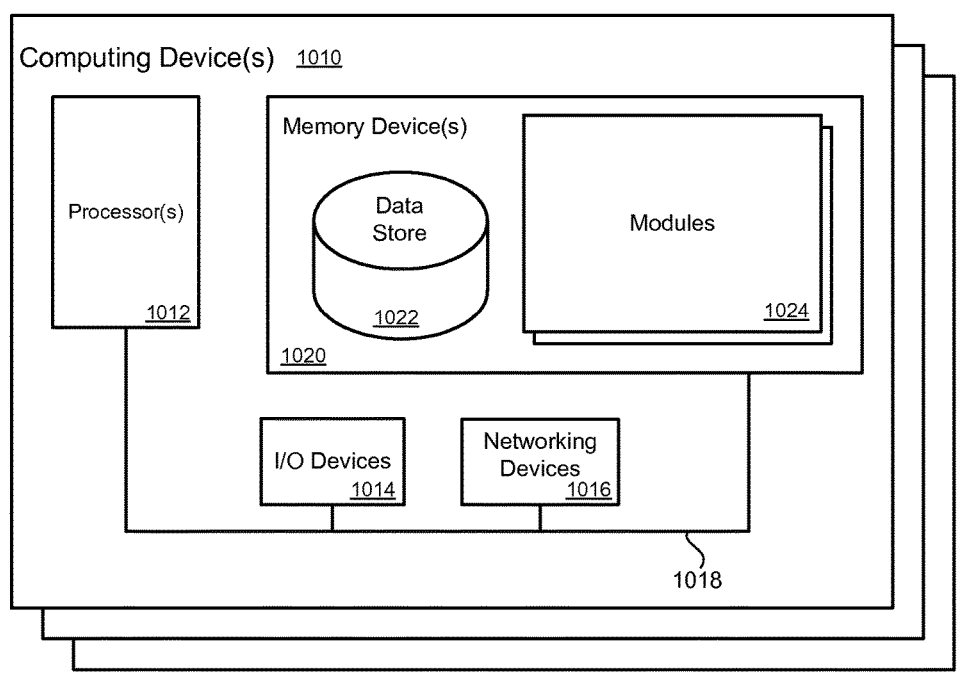
FIG. 10 is block diagram illustrating a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1324. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium comprising instructions embodied thereon, the instructions upon execution by a processor cause a system to:
   receive a request to launch a computing instance in a computing service environment, the request including placement constraints for placement of the computing instance during launch;
   provide instance features associated with the computing instance and physical host features associated with a group of physical hosts in the computing service environment to a machine learning model;
   determine estimated launch times for launching the computing instance on individual physical hosts in the computing service environment using the machine learning model, wherein the machine learning model uses historical launch time information to determine the estimated launch times in view of the instance features and the physical host features; and
   select a physical host from the group of physical hosts to provide placement of the computing instance according to a lower estimated launch time as compared to other physical hosts in the group of physical hosts and the placement constraints included in the request to launch the computing instance,
   wherein the physical host is selected for placement of the computing instance using a weighting value assigned to the estimated launch times for the computing instance.

2. The non-transitory machine readable storage medium as in claim 1, further comprising instructions that upon execution further cause the system to: select the physical host from the group of physical hosts to provide placement of the computing instance using placement constraints included in the request to launch the computing instance.

3. The non-transitory machine readable storage medium as in claim 1, wherein the estimated launch times are one of a plurality of factors used when selecting the physical host for placement of the computing instance, the plurality of factors including at least one of a physical host utilization placement factor, a licensing cost placement factor and a disaster impact factor.

4. A computer implemented method, comprising:
   under control of one or more computer systems configured with executable instructions:
   receiving a request to launch a computing instance in a computing service environment, the request including placement constraints for placement of the computing instance during launch, using one or more processors of the computer systems;
   identifying estimated launch times for the computing instance to launch on physical hosts in a group of physical hosts, wherein the estimated launch times are determined using historical launch time information in view of instance features associated with the computing instance and physical host features associated with the physical hosts in the group of physical hosts, using the one or more processors of the computer systems; and
   selecting a physical host in the group of physical hosts to place the computing instance based in part on the estimated launch times for the computing instance and the placement constraints included in the request to launch the computing instance, using the one or more processors of the computer systems,
   wherein the physical host is selected for placement of the computing instance using a weighting value assigned to the estimated launch times for the computing instance.

5. The method of claim 4, further comprising causing the computing instance on the physical host to be launched.

6. The method of claim 4, further comprising:
   comparing the estimated launch times for the computing instance on each physical host with other physical hosts in the group of physical hosts; and
   selecting the physical host in the group of physical hosts with a lower estimated launch time as compared with the other physical hosts in the group of physical hosts.

7. The method of claim 4, wherein the instance features associated with the computing instance include user selected features.

8. The method of claim 4, further comprising identifying the estimated launch times for launching the computing instance using a regression model.

9. The method of claim 4, further comprising selecting the physical host in the group of physical hosts to place the computing instance using additional placement factors, the additional placement factors including at least one of: a physical host utilization placement factor, a licensing cost placement factor or a disaster impact placement factor.

10. The method of claim 4, further comprising selecting the physical host that includes a lower number of computing instances being simultaneously launched as compared to other physical hosts in the group of physical hosts.

11. The method of claim 4, further comprising selecting a region or a zone for placement of the computing instance based in part on the estimated launch times for computing instances in the region or zone.

12. The method of claim 4, further comprising verifying that the physical host selected to execute the computing instance is not simultaneously executing a number of computing instances that exceeds a predetermined threshold.

13. The method of claim 4, wherein the estimated launch times include a period of time between receiving a computing instance launch request from a customer and booting the computing instance on the physical host.

14. The method of claim 4, further comprising:
identifying an estimated amount of time to launch an attachment associated with the computing instance; and
selecting the physical host that can provide placement of the computing instance with a lower estimated attachment time as compared to other physical hosts in the group of physical hosts.

15. A system for determining computing instance placement, comprising:
a processor;
a memory device including instructions that, when executed by the processor, cause the system to:
receive a request to launch a computing instance on a computing service provider, the request including placement constraints for placement of the computing instance during launch;
identify estimated launch times for launching the computing instance on a physical host based in part on instance features associated with the computing instance and physical host features associated with physical hosts configured to host computing instances, wherein the estimated launch times are determined using historical launch time information in view of the instance features and the physical host features; and
select a physical host to place the computing instance based in part on the estimated launch times for the computing instance and the placement constraints included in the request to launch the computing instance,
wherein the physical host is selected for placement of the computing instance using a weighting value assigned to the estimated launch times for the computing instance.

16. The system of claim 15, wherein the memory device including instructions that, when executed by the processor, cause the system to select the physical host having a lower number of computing instances that are simultaneously being launched as compared to other physical hosts.

17. The system of claim 15, wherein the memory device including instructions that, when executed by the processor, cause the system to verify that the physical host selected to execute the computing instance is not simultaneously executing a number of computing instances that exceeds a predetermined threshold.

18. The system of claim 15, wherein the memory device including instructions that, when executed by the processor, cause the system to identify the estimated launch times for the computing instance using a regression model that predicts launch times for computing instances based in part on the instance features and the physical host features.

* * * * *